United States Patent
Takemoto et al.

(10) Patent No.: US 6,506,240 B2
(45) Date of Patent: Jan. 14, 2003

(54) INK FOR INK JET RECORDING

(75) Inventors: Kiyohiko Takemoto, Nagano-Ken (JP); Kazuhide Kubota, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/736,086

(22) Filed: Dec. 13, 2000

(65) Prior Publication Data

US 2001/0025588 A1 Oct. 4, 2001

(30) Foreign Application Priority Data

Dec. 14, 1999 (JP) .......................................... 11-354500

(51) Int. Cl.$^7$ ............................................... C09D 11/00
(52) U.S. Cl. ............................. 106/31.36; 106/31.59; 106/31.68; 106/31.89
(58) Field of Search .................... 106/31.36, 31.59, 106/31.68, 31.89

(56) References Cited

U.S. PATENT DOCUMENTS

| | | | |
|---|---|---|---|
| 4,978,409 A | 12/1990 | Fujiwara | 156/315 |
| 5,120,359 A | 6/1992 | Uzukawa | 106/20 |
| 5,324,349 A | 6/1994 | Sano | 106/25 R |
| 5,356,464 A | 10/1994 | Hickman et al. | 106/20 |
| 5,503,664 A | 4/1996 | Sano | 106/20 R |
| 5,709,737 A | 1/1998 | Malhotra et al. | 106/31.43 |
| 5,954,866 A * | 9/1999 | Ohta et al. | 106/31.68 |
| 5,961,703 A | 10/1999 | Fraas | 106/31.29 |
| 6,004,389 A * | 12/1999 | Yatake | 106/31.28 |
| 6,075,069 A * | 6/2000 | Takemoto | 106/31.6 |
| 6,284,029 B1 * | 9/2001 | Sano et al. | 106/31.6 |

FOREIGN PATENT DOCUMENTS

| | | | |
|---|---|---|---|
| EP | 0739743 | 10/1996 | |
| EP | 0831135 | 3/1998 | |
| EP | 0885744 | 12/1998 | |
| JP | 55(1980)-157668 | 12/1980 | ........... C09D/11/16 |
| JP | 56(1981)-28256 | 3/1981 | ........... C09D/11/00 |
| JP | 62(1987)-1426 | 1/1987 | ........... C09D/11/00 |
| JP | 01(1989)-217088 | 8/1989 | ........... C09D/11/16 |
| JP | 02(1990)-18427 | 1/1990 | ............... C08J/5/18 |
| JP | 02(1990)-214785 | 8/1990 | ........... C09D/11/02 |
| JP | 03(1991)-160068 | 7/1991 | ........... C09D/11/00 |
| JP | 04(1992)-18462 | 1/1992 | ........... C09D/11/00 |
| JP | 06(1994)-212106 | 8/1994 | ........... C09D/11/00 |
| JP | 2759215 | 3/1998 | ........... C09D/11/16 |

OTHER PUBLICATIONS

JPO Abstract 02(1990)–214785, Aug. 27, 1990.
JPO Abstract 56(1981)–28256, Mar. 19, 1981.
JPO Abstract 55(1980)–157668, Dec. 8, 1980.
JPO Abstract 03(1991)–160068, Jul. 10, 1991.
JPO Abstract 04(1992)–18462, Jan. 22, 1992.

* cited by examiner

*Primary Examiner*—Helene Klemanski
*Assistant Examiner*—Veronica F. Faison
(74) *Attorney, Agent, or Firm*—Ladas & Parry

(57) ABSTRACT

There is provided an ink composition which can realize good images, especially an ink composition which, when used in an ink jet recording method, can be stably ejected and can realize good image quality. The ink composition comprises: a colorant; water; a water soluble organic solvent; and a mixture of saccharides, wherein the mixture of saccharides comprises a monosaccharide and/or a derivative thereof, a disaccharide and/or a derivative thereof, and a tri or higher polysaccharide and/or a derivative thereof.

21 Claims, No Drawings

INK FOR INK JET RECORDING

BACKGROUND OF THE INVENTION

1. Field of the Invention

The present invention relates to an ink composition which can yield highquality printed images.

2. Background Art

Ink jet recording is a recording method wherein droplets of ink are ejected through fine nozzles to form letters or figures on the surface of recording media. various properties are required of inks used in such ink jet recording, and examples thereof include good dispersion stability, ejection stability, and rubbing/scratch resistance of prints.

Inks comprising various watersoluble dyes dissolved in aqueous media have generally been used. Further, inks comprising pigments dispersed in aqueous media have also been provided. Inks comprising pigments dispersed in aqueous media are advantageously superior to inks using water-soluble dyes in waterfastness and lightfastness of printed images.

On the other hand, inks for ink jet recording are required to satisfy property requirements such that, for example, properties remain unchanged during storage for a long period of time, the ink does not clog fine nozzles, prints have high density and high sharpness, and prints yielded by the inks have good storage stability, for example, in terms of waterfastness and lightfastness. In particular, in the case of pigment-based inks, storage stability (that is, stable dispersion of the pigment for a long period of time) and freedom from nozzle clogging during printing or at the time of restarting after interruption of printing are required.

The following pigmentbased inks have been proposed. For example, Japanese Patent Publication No. 1426/1987 proposes an ink comprising a pigment and a resin emulsion dispersed in water. The claimed advantage of using an emulsion comprising a waterinsoluble synthetic resin is to improve the storage stability of the pigment ink.

Japanese Patent LaidOpen No. 157668/1980 proposes that the dispersion of a pigment in a waterinsoluble resin emulsion dispersion enables the dispersion stability to be maintained even at relatively low viscosity. Japanese Patent LaidOpen No. 217088/1989 describes that the use of an emulsion having a specific filmforming temperature can improve the storage stability and fluidity of the ink. Likewise, inks using a resin emulsion are proposed in Japanese Patent Laid-Open Nos. 160068/1991 and 18462/1992. Japanese Patent LaidOpen No. 18427/1990 proposes the addition of inositol to the ink to alleviate nozzle clogging. Japanese Patent LaidOpen No. 214785/1990 proposes the addition of maltitol to the ink to improve the anti-drying properties of the ink.

SUMMARY OF THE INVENTION

The present inventors have now found that an ink composition containing a mixture of saccharides can realize good printed images. In particular, the present inventors have found that this ink composition, when used in an ink jet recording method, can be stably ejected, does not cause nozzle clogging, can realize stable printing, and thus can realize excellent images. The present invention has been made based on such finding.

Accordingly, it is an object of the present invention to provide an ink composition which can realize good images, especially an ink composition which, when used in an ink jet recording method, can be stably ejected and can realize good image quality.

According to one aspect of the present invention, there is provided an ink composition comprising: a colorant; water; a watersoluble organic solvent; and a mixture of saccharides, wherein said mixture of saccharides comprises (a) a monosaccharide and/or a derivative thereof, (b) a disaccharide and/or a derivative thereof, and (c) a tri or higher polysaccharide and/or a derivative thereof.

DESCRIPTION OF THE PREFERRED EMBODIMENTS

Ink composition

The ink composition according to the present invention is used in recording methods using ink compositions, for example, ink jet recording, recording method using writing utensils, such as pens, and other various printing methods. Particularly preferably, the ink composition according to the present invention is used in the ink jet recording method.

Mixture of saccharides

The ink composition according to the present invention contains a mixture of saccharides. The mixture of saccharides comprises a monosaccharide and/or a derivative thereof, a disaccharide and/or a derivative thereof, and a tri- or higher polysaccharide and/or a derivative thereof. The addition of the mixture of saccharides and/or derivatives thereof to the ink composition can effectively prevent nozzle clogging, and consequently can produce excellent printed images by virtue of excellent ejection stability.

Specific examples of monosaccharides include threose, erythrulose, erythrose, arabinose, ribulose, ribose, xylose, xylulose, lyxose, glucose, fructose, mannose, idose, sorbose, gulose, talose, tagatose, galactose, allose, psicose, and altrose. Among them, glucose and xylose are preferred.

Specific examples of disaccharides include maltose, isomaltose, cellobiose, lactose, sucrose, trehalose, isotrehalose, gentiobiose, melibiose, turanose, sophorose, and isosaccharose. Among them, maltose and isomaltose are preferred.

Tri- or higher polysaccharides include: homoglycans, such as glucan, fructan, mannan, xylan, galacturonane, mannuronane, and N-acetylglucosamine polymer; and heteroglycans, such as diheteroglycan and triheteroglycan. Specific examples of such polysaccharides include maltotriose, isomaltotriose, panose, maltotetraose, and maltopentaose. Among them, maltotriose and isomaltotriose are preferred.

According to a preferred embodiment of the present invention, reducing branched oligosaccharides may be mentioned as disaccharides or tri- or higher polysaccharides. According to the present invention, the "reducing branched oligosaccharide" refers to an oligosaccharide which is constituted by about 2 to 10 monosaccharides, preferably 2 to 5 monosaccharides, has a branched structure, and a reducing capability. The oligosaccharide may be either a homo-oligosaccharide or a hetero-oligosaccharide with the homo-oligosaccharide being preferred.

According to a preferred embodiment of the present invention, the reducing branched oligosaccharide comprises at least two glucoses bonded to each other through an $\alpha 1,6$ glucoside linkage and has a branched structure. This type of oligosaccharide is preferably prepared from one member or a mixture of two or more members selected from the group consisting of starch, amylopectin, and glycogen. The reducing branched oligosaccharide may be prepared from the above compound(s) by a commonly used conventional method. Among others, an example of preferred methods is hydrolysis. Further, according to the present invention, besides the hydrolysis of polysaccharides, glucoside linkage of glucose or isomerization of maltose may be used for the preparation of the reducing branched oligosaccharide.

According to a preferred embodiment of the present invention, the reducing branched oligosaccharide is one member or a mixture of two or more members selected from the group consisting of isomaltose, panose, and isomaltotriose.

Further, according to the present invention, commercially available reducing branched oligosaccharides may also be used. Specific examples thereof include HS300 and HS500 (tradenames; manufactured by Hayashibara Co., Ltd.) and PO300 and PO500 (tradenames; manufactured by Towa Chemical Industry Co., Ltd.).

Derivatives of saccharides include sugar alcohols, sugar acids, amino sugars, and thiosugars. Among them, sugar alcohols and amino sugars are preferred.

The sugar alcohol is preferably selected from the group consisting of monosaccharides-derived sugar alcohols, disaccharides-derived sugar alcohols, and tri- or higher polysaccharides-derived sugar alcohols. monosaccharides-derived sugar alcohols include glycerin, threitol, erythritol, arabitol, ribitol, xylitol, lyxitol, sorbitol (glucitol), mannitol, iditol, gulitol, talitol, galactitol, allitol, and altritol. Among them, xylitol, sorbitol, and glycerin are preferred.

Disaccharides-derived sugar alcohols include maltitol, isomaltitol, lactitol, and turanitol. Among them, maltitol and isomaltitol are preferred. The use of maltitol or isomaltitol can further improve the ejection stability and thus can realize better-printed images.

Sugar acids typically include uronic acids (saccharide derivatives having a monocarboxylic acid) and aldaric acids (saccharide derivatives having a dicarboxylic acid). Specific examples of uronic acid include glyceric acid, threuronic acid, erythronic acid, xylironic acid, ribulonic acid, arabinulonic acid, lyxulonic acid, mannuronic acid, glucuronic acid, gluronic acid, iduronic acid, talronic acid, altruronic acid, alronic acid, and galacturonic acid. Among them, glyceric acid is preferred. Specific examples of aldaric acids include glyceraric acid (tartronic acid), threaric acid (tartaric acid), erythraric acid (mesotartaric acid), xyraric acid, ribaric acid, arabaric acid, lyxaric acid, mannaric acid, glucaric acid, glaric acid, idaric acid, talaric acid, altraric acid, araric acid, and galactaric acid. Among them, glyceraric acid is preferred.

The amino sugar is a saccharide wherein hydroxyl groups of sugar have been substituted by an amino group. The thio sugar is a saccharide wherein oxygen atoms of sugar have been substituted by a sulfur atom. The amino sugar may be prepared by substituting hydroxyl groups of sugar by an amino group, and the thio sugar may be prepared by substituting oxygen atoms of sugar by a sulfur atom.

According to a preferred embodiment of the present invention, the mixture of saccharides and/or derivatives thereof contains maltitol as a disaccharide derivative. According to a more preferred embodiment of the present invention, the mixture of saccharides and/or derivatives thereof is a mixture of the maltitol with xylitol and reducing branched oligosaccharide.

According to a preferred embodiment of the present invention, the total content of the monosaccharide and/or the derivative thereof and the tri- or higher polysaccharide and/or the derivative thereof is about 2% by weight to less than 30% by weight, preferably about 5% by weight to less than 25% by weight, based on the total amount of the mixture of saccharides.

According to another preferred embodiment of the present invention, the content of the disaccharide and/or the derivative thereof is about more than 70% by weight to less than 98% by weight, preferably about 75% by weight to less than 95% by weight, based on the total amount of the mixture of eaccharides.

Colorant

According to the present invention, the colorant contained in the ink composition may be any of dyes and pigments. When the inhibition of penetration of the coloring component contained in the ink composition, for example, by taking advantage of the action of insolubilization or thickening of the ink composition, is contemplated, the use of a pigment dispersed in an aqueous medium is more advantageous than the use of a dye dissolved in an aqueous medium.

Dyes usable herein include various dyes commonly used in ink compositions, especially used in ink jet recording, such as direct dyes, acid dyes, foodstuff dyes, basic dyes, reactive dyes, disperse dyes, vat dyes, soluble vat dyes, and reactive disperse dyes.

Inorganic and organic pigments may be used as the pigment without particular limitation. Inorganic pigments usable herein include, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dyetype chelate pigment (for example, basic dyetype chelate pigments and acid dye-type chelate pigment), nitro pigments, nitroso pigments, and aniline black.

Carbon blacks usable for black inks include carbon blacks manufactured by Mitsubishi Chemical Corporation, for example, No. 2300, No. 900, MCF 88, No. 33, No. 40, No. 45, No.52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

Pigments for yellow inks include C.I. Pigment Yellow 1, C.I. Pigment Yellow 2, C.I. Pigment Yellow 3, C.:. Pigment Yellow 12, C.J. Pigment Yellow 13, C.I. Pigment Yellow 14, C.I. Pigment Yellow 16, C.I. Pigment Yellow 17, C.I. Pigment Yellow 73,, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.t. Pigment Yellow 154, C.I. Pigment Yellow 155, C.I. Pigment Yellow 180, and C.I. Pigment Yellow 185.

Pigments for magenta inks include C.I. Pigment Red 5, C.I. Pigment Red 7, C.I. Pigment Red 12, C.I. Pigment R ed 48 (Ca), C.I. Pigment Red 48 (Mn), C.I. Pigment Red 57 (Ca), C.I. Pigment Red 57 : 1, C.I. Pigment Red 112, C.I. Pigment Red 122, C.I. Pigment Red 123, C.I. Pigment Red 168,5 C.I. Pigment Red 184, and C.I. Pigment Red 202.

Pigments for cyan inks include C.I. Pigment Blue 1, C.I. Pigment Blue 2, C.I. Pigment Blue 3, C.I. Pigment Blue 15 C3, C.I. Pigment Blue 15 : 34, C.. Pigment e Blue 16, C.I. Pigment Blue 22, C.I. Pigment Blue 60, C.I. Vat Blue 4, and C.I. Vat Blue 60.

The amount of the pigment added is preferably about 0.5 to 25% by weight, more preferably about 2 to 15% by weight, based on the ink composition. The particle diameter of the pigment is preferably not more than 10 µm, more preferably not more than 0.1 µm.

According to a preferred embodiment of the present invention, this pigment is added, to the ink composition, as a pigment dispersion prepared by dispersing the pigment in a solvent with the aid of a dispersant. Preferred dispersants usable herein include conventional dispersants commonly used in the preparation of pigment dispersions, for example, polymeric dispersants and surfactants.

Examples of preferred polymeric dispersants include naturally occurring polymeric compounds, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxyethylcellulose.

Examples of preferred polymeric dispersants include synthetic polymeric compounds, and examples thereof include polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/alkyl acrylate copolymer; styrene/acrylic acid resins, such as styrene/acrylic acid copolymer, styrene/methacrylic acid copolymer, styrene/methacrylic acid/alkyl acrylate copolymer, styrene/ α-methylstyrene/acrylic acid copolymer, and styrene/ α-methylstyrene/acrylic acid/ alkyl acrylate copolymer; styrene/maleic acid copolymer; styrene/maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers. Among them, a copolymer of a monomer having a hydrophobic group with a monomer having a hydrophilic group and a polymer of a monomer having both a hydrophobic group and a hydrophilic group are particularly preferred. Examples of the salt referred to above include salts with diethylamine, ammonia, ethylamine, triethylamine, propylamine, isopropylamine, dipropylamine, butylamine, isobutylamine, triethanolamine, diethanolamine, aminomethyl propanol, or morpholine. For these copolymers, the weight average molecular weight is preferably 3,000 to 30,000, more preferably 5,000 to 15, 000.

Examples of preferred surfactants as the dispersant include: anionic surfactants, such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants, such as fatty acid amine salts, quaternary ammonium salts, sulfonium salts, and phosphoniums; and nonionic surfactants, such as polyoxyethylene alkyl ethers, polyoxyethylene alkyl esters, sorbitan alkyl esters, and polyoxyethylene sorbitan alkyl esters. A person having ordinary skill in the art would appreciate that these surfactants, when added to the ink composition, functions also as a surfactant.

The amount of the dispersant added is preferably 1 to 50% by weight, more preferably 5 to 30% by weight, based on the pigment.

Resin emulsion

The ink composition according to a preferred embodiment of the present invention may contain a resin emulsion. The term "resin emulsion" used herein refers to an aqueous dispersion comprising water as a continuous phase and fine particles of a polymer as a dispersed phase (dispersed particles). This aqueous dispersion is often called "aqueous emulsion" or "polymer emulsion." Resin components constituting the dispersed particles include acrylic resin, vinyl acetate resin, styrene/butadiene resin, vinyl chloride resin, acryl/styrene resin, butadiene resin, styrene resin, crosslinked acrylic resin, crosslinked styrene resin, benzoguanamine resin, phenolic resin, silicone resin, methacrylic acid resin, urethane resin, actylamide resin, and epoxy resin, or mixtures of these resins. These resins are not limited by the form of the copolymer, and may exist, for example, in the form of a block copolymer or a random copolymer. According to a preferred embodiment of the present invention, the resin emulsion preferably contains a resin composed mainly of an acrylic ester and/or a methacrylic ester.

According to the present invention, preferably, the resin emulsion has a filmforming property. The term "filmforming property" as used herein means that evaporating the water component of an aqueous emulsion prepared by dispersing the resin emulsion in water results in the formation of a resin film. Likewise, the ink composition with the resin emulsion added thereto has a property such that evaporating the solvent component results in the formation of a resin film. This resin film functions to strongly fix the colorant component contained in the ink composition onto the surface of recording media. This is considered to realize images having excellent rubbing/suratch resistance.

According to a preferred embodiment of the present invention, the minimum filmforming temperature of the resin emulsion is room temperature or above, more preferably 50° C. or above, most preferably 80° C. or above. This is because the formation of a film from the resin emulsion having a filmforming property is preferably carried out at room temperature or above. Here the term "minimum filmforming temperature" used herein refers to a minimum temperature at which, when an aqueous emulsion prepared by dispersing a resin emulsion in water is thinly cast onto a sheet of a metal, such as aluminum, to form a coating which is then gradually heated, a transparent, continuous film is formed.

According to another preferred embodiment of the present invention, the resin emulsion has a structure derived from an unsaturated vinyl monomer having a carboxyl group and a structure crosslinked by a crosslinkable monomer having two or more polymerizable double bonds. In this type of resin emulsion, at the time of polymerization, a crosslinkable monomer having at least two, preferably at least three, polymerizable double bonds is copolymerized to form a three dimensionally crosslinked structure.

According to the present invention, the resin emulsion may have a singleparticle structure. On the other hand, according to the present invention, a resin emulsion having a core/shell structure may also be utilized. The core/shell structure comprises a core and a shell surrounding the core. The term "core/shell structure" used herein refers to "a form such that two or more polymers having different compositions are present in a phase separated state in a particle." Forms of the core/shell structure usable in the present invention include a form wherein the core is entirely covered with the shells a form wherein the core is partially covered with the shell, and a form wherein a part of the polymer constituting the shell forms a domain or the like within the core particle. Further, a multilayer structure of three or more layers may be adopted wherein at least one additional layer having a different composition is further interposed between the core and the shell. In the resin emulsion having a core/shell structure, the reduction in the amount of water and the watersoluble organic solvent causes coalescence of the resin emulsions with one another, and deformation occurs due to pressure involved in the film formation. As a result, it is considered that reactive functional groups present in both the core and the shell are bonded to each other to form a network structure. This can advantageously form a coating having higher strength. In the present invention, the property such that, when reactive functional groups are allowed to coexist within the resin emulsion, these groups are reacted with each other without the addition of any curing agent at the time of film formation to form a network structure, will be referred to as "self-crosslinkable."

The resin emulsion used in the method according to the present invention may be prepared by conventional emulsion polymerization. Specifically, the resin emulsion may be prepared by emulsion polymerization of an unsaturated vinyl monomer in water in the presence of a polymerization catalyst and an emulsifier.

Unsaturated vinyl monomers usable herein include those commonly used in emulsion polymerization, such as acrylic ester monomers, methacrylic ester monomers, aromatic vinyl monomers, vinyl ester monomers, vinyl cyanide compound monomers, halogenated monomers, olef in monomers, and diene monomers. Specific examples thereof include: acrylic esters, such as methyl acrylate, ethyl acrylate, isopropyl acrylate, nbutyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, nhexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanide compounds, such as acrylonitrile and methacrylonitrile; halogenated monomers, such as vinylidene chloride and vinyl chloride; aromatic vinyl monomers, such as styrene, 2-methylstyrene, vinyltoluene, tbutylstyrene, chlorostyrene, vinylanisole, and vinylnaphthalene; olefins, such as ethylene, propylene, and isopropylene; dienes, such as butadiene and chloroprene; and vinyl monomers, such as vinyl ether, vinyl ketone, and vinylpyrrolidone. In the case of monomers not having a carboxyl group, an unsaturated vinyl monomer having a carboxyl group should be used. Preferred examples thereof include acrylic acid, methacrylic acid, itaconic acid, fumaric acid, and maleic acid. Among them, methacrylic acid is preferred. Emulsifiers usable herein include anionic surfactants, nonionic surfactants, and mixtures of these surfactants.

The addition of acrylamides or hydroxylcontaining monomers besides the above monomers can further improve printing stability. Specific examples of acrylamides include acrylamide and N,N'-dimethylacrylamide. Specific examples of hydroxyl-containing monomers include 2-hydroxyethyl acrylate, 2-hydroxypropyl acrylate, 2-hydroxyethyl methacrylate, and 2-hydroxypropyl methacrylate. They may be used alone or as a mixture of two or more.

The resin emulsion having a core/shell structure may be produced by conventional methods, generally multistep emulsion polymerization and the like, for example, by a method disclosed in Japanese Patent Laid-Open No. 76004/1992. specific examples of unsaturated vinyl monomers usable in the polymerization include those described above.

In the emulsion polymerization, initiators, surfactants, molecular weight regulators, neutralizing agents and the like may be used according to a conventional method.

According to the present invention, conventional resin emulsions may also be used. For example, resin emulsions described in Japanese Patent Publication No. 1426/1987 and Japanese Patent Laid-Open Nos. 56573/1991, 79678/1991, 160068/1991, and 18462/1992 as such may be used.

Further, commercially available resin emulsions may also be used, and examples thereof include Microgel E-1002 and E-5002 (emulsion of styrene/acrylic resin, manufactured by Nippon Paint co., Ltd.), Voncoat 4001 (emulsion of acrylic resin, manufactured by Dainippon Ink and Chemicals, Inc.), Voncoat 5454 (emulsion of styrene/acrylic resin, manufactured by Dainippon Ink and Chemicals, Inc.), SAE-1014 (emulsion of styrene/acrylic resin, manufactured by Nippon Zeon Co., Ltd.), and Saivinol SK-200 (emulsion of acrylic resin, manufactured by Saiden Chemical Industry Co., Ltd.).

According to the present invention, the resin emulsion may be mixed, in the form of a powder of fine particles, with other ingredients of the ink composition. A preferred method is such that the resin emulsion are dispersed in a water medium to form a aqueous emulsion which is then mixed with other ingredients of the ink composition. The content of the resin emulsion is preferably about 0.1 to 40% by weight, more preferably about 1 to 25% by weight, based on the ink composition. The molecular weight of the resin emulsion is not less than 10,000, preferably not less than 100,000. The particle diameter of the resin emulsion is preferably about 10 to 400 nm, more preferably about 50 to 200 nm.

Water, water-soluble organic solvent, and other optional ingredients

The solvent in the ink composition according to the present invention is composed mainly of water and a water-soluble organic solvent. If necessary, any optional ingredient may be contained in the ink composition according to the present invention.

Specific examples of water-soluble organic solvents include: alkyl alcohols containing 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mononpropyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; and formamide, acetamide, dimethylsulfoxide, sorbitol, sorbitan, acetin, diacetin, triacetin, and sulfolane.

Further, according to a preferred embodiment of the present invention, among these water-soluble organic solvents, those having a boiling point of 180° C. or above are preferably utilized. The use of water-soluble organic solvents having a boiling point of 180° C. or above offers water retention and wetting of the ink composition. By virtue of this, an ink composition can be realized which causes neither coagulation of the pigment nor an increase in viscosity of the ink composition even after storage for a long period of time, that is, possesses excellent storage stability, and, even when allowed to stand in an open state (that is, when allowed to stand in contact with air at room temperature), can maintain the fluidity and the redispersibility for a long period of time, and, in addition, does not cause clogging of nozzles during printing or at the time of restarting after interruption of printing, thus offering high ejection stability.

Specific examples of watersoluble organic solvents having a boiling point of 180° C. or above include ethylene glycol (b.p.; 197° C.; the boiling point being hereinafter described within parentheses), propylene glycol (187° C.), diethylene glycol (245° C.), pentamethylene glycol (242° C.), trimethylene glycol (214° C.), 2-butene1, 4-diol (235° C.), 2-ethyl1, 3-hexanediol (243° C.), 2-methyl2, 4-pentanediol (197° C.), N-methyl2-pyrrolidone (202° C.), 1, 3-dimethyl2-imidazolidinone (257-260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). Among them, water soluble organic solvents having a boiling point of 200° C. or above are preferred. They may be used alone or as a mixture of two or more.

The content of the watersoluble organic solvent is preferably about 10 to 50% by weight, more preferably 10 to 30% by weight.

According to a preferred embodiment of the present invention, the ink composition according to the present invention may contain a tertiary amine or an alkali hydroxide. The addition of the tertiary amine can offer wetting properties. The addition of the tertiary amine and the alkali hydroxide can offer the dispersion stability of the colorant and the resin emulsion in the ink composition.

Specific examples of tertiary amines include trimethylamine, triethylamine, triethanolamine, dimethylethanolamine, diethylethanolamine, triisopropenolamine, and butyldiethanolamine. They may be used alone or as a mixture of two or more. The amount of the tertiary amine added is preferably about 0.1 to 10% by weight, more preferably 0.5 to 5% by weight, based on the ink composition.

Specific examples of alkali hydroxides include potassium hydroxide, sodium hydroxide, and lithium hydroxide, and the amount of the alkali hydroxide added is preferably about 0.01 to 5% by weight, more preferably about 0.05 to 3% by weight, based on the ink composition.

The ink composition according to the present invention may further comprise a surfactant. Specific examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkyl-amides), and acetylene glycol. They may be used alone or in combination of two or more.

According to a preferred embodiment of the present invention, among the above surfactants, an acetylene glycol surfactant is preferably contained in the ink composition. The addition of the acetylene glycol surfactant can enhance the penetration of the ink composition into recording media, and thus can realize printing having no significant feathering or bleeding on various recording media. Specific examples of preferred acetylene glycol surfactants usable in the present invention include compounds represented by formula (I):

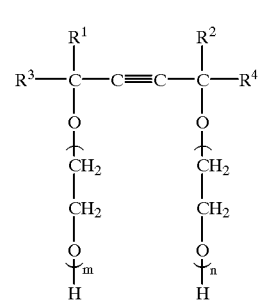

wherein $0 \leq m+n \leq 50$; and $R^1$, $R^2$, $R^3$, and $R^4$ each independently represent an alkyl group (preferably a straightchain or branched alkyl group having 1 to 6 carbon atoms).

Among the compounds represented by formula (I), particularly preferred compounds include 2, 4, 7, 9-tetramethyl-5-decyne-4, 7-diol, 3, 6-dimethyl-4-octyne 3, 6-diol, and 3, 5-dimethyl-1-hexyn-3ol. Commercially available products may also be used as the acetylene glycol surfactant represented by the formula (I). Specific examples thereof include Surfynol 104, Surfynol 82, Surfynol 465, Surfynol 485, and Surfynol TG (all the above products being available from Air Products and Chemicals Inc.) and OLFINE STG and OLFINE E 1010 (tradenames: manufactured by Nissin Chemical Industry Co., Ltd.).

The amount of the surfactant added is preferably 0.01 to 10% by weight, more preferably 0.1 to 5% by weight, still more preferably 0.5 to 3% by weight, based on the ink composition.

If necessary, pH adjustors, preservatives, antimolds and the like may be added to the ink composition from the viewpoint of improving the storage stability of the ink composition.

EXAMPLES

The present invention will be described in more detail with reference to the following examples, though it is not limited to these examples only. In the following examples, MFT refers to a minimum filmforming temperature.

Pregaration of mixtures of saccharides

Mixtures of saccharides were prepared according to formulations indicated in Table 1 below. These mixtures were designated as Mixtures A to E. Figures in Table 1 represent % by weight of each saccharide and each saccharide derivative based on the total amount of the mixture.

TABLE 1

| Mixture | A | B | C | D | E |
|---|---|---|---|---|---|
| Sorbitol |  | 3 | 3 | 2 | 1 |
| Xylitol | 3 |  |  |  |  |
| Trehalose |  |  | 30 |  | 1 |
| Maltitol | 94 | 94 | 40 | 77 | 98 |
| Maltotriose |  | 3 | 27 | 21 |  |
| Isomaltotriose | 3 |  |  |  |  |

Preparation of ink compositions

Ink compositions of Examples having the following respective compositions were prepared.

The ink compositions were prepared according to the following procedure. The pigment, the dispersant, and a part of water were mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed to prepare a dispersion of carbon black. Separately, all the following ingredients except for the pigment, the dispersant and the part of water used in the preparation of the carbon black dispersion were mixed together to prepare an ink solvent. The ink solvent was gradually added dropwise to the pigment dispersion while stirring the dispersion. The mixture was stirred at room temperature for 20 min. The mixture was filtered through a 5-μm membrane filter to prepare an ink composition for ink jet recording.

| Example 1 | |
|---|---|
| Mixture A | 20 wt % |
| Carbon Black MA 7 (manufactured by Mitsubishi Chemical Corporation) | 3 wt % |
| Styrene-maleic anhydride copolymer (dispersant) | 1 wt % |
| Microgel E-1002 (styrene-acrylic resin emulsion, resin component 19.9%, MFT about 80° C., manufactured by Nippon Paint Co., Ltd.) | 5 wt % |
| Glycerin | 5 wt % |
| Pure water | Balance |
| Example 2 | |
| Mixture B | 20 wt % |
| Carbon Black MA 7 (manufactured by Mitsubishi Chemical Corporation) | 3 wt % |
| Styrene-maleic anhydride copolymer (dispersant) | 10 wt % |
| Glycerin | 10 wt % |
| pure water | Balance |
| Example 3 | |
| Mixture C | 20 wt % |
| Carbon Black MA 7 (manufactured by Mitsubishi Chemical Corporation) | 3 wt % |
| Styrene-maleic anhydride copolymer (dispersant) | 1 wt % |
| Microgel E-1002 (styrene-acrylic resin emulsion, resin component 19.9%, MFT about 80° C., manufactured by Nippon Paint Co., Ltd.) | 5 wt % |
| Glycerin | 5 wt % |
| Pure water | Balance |
| Example 4 | |
| Mixture D | 20 wt % |
| Carbon Black MA 7 (manufactured by Mitsubishi Chemical Corporation) | 3 wt % |
| Styrene-maleic anhydride copolymer (dispersant) | 1 wt % |
| Microgel E-1002 (styrene-acrylic resin emulsion, resin component 19.9%, MFT about 80° C., manufactured by Nippon Paint Co., Ltd.) | 5 wt % |
| Glycerin | 5 wt % |
| Pure water | Balance |
| Example 5 | |
| Mixture B | 20 wt % |
| Carbon Black MA 7 (manufactured by Mitsubishi Chemical Corporation) | 3 wt % |
| Styrene-maleic anhydride copolymer (dispersant) | 1 wt % |
| Microgel E-1002 (styrene-acrylic resin emulsion, resin component 19.9%, MFT about 80° C., manufactured by Nippon Paint Co., Ltd.) | 5 wt % |
| Glycerin | 5 wt % |
| Pure water | Balance |
| Example 6 | |
| Mixture D | 10 wt % |
| C.I. Pigment Blue 15 : 3 | 2 wt % |
| Styrene-acrylic acid copolymer ammonium salt (dispersant) | 1 wt % |
| Voncoat 5454 (acrylic resin emulsion, resin component 50%, MFT 5° C., manufactured by Dainippon Ink and Chemicals, Inc.) | 10 wt % |
| Glycerin | 5 wt % |
| Pure water | Balance |
| Comparative Example 1 | |
| Mixture E | 20 wt % |
| Carbon Black MA 7 (manufactured by Mitsubishi Chemical Corporation) | 3 wt % |
| Styrene-maleic anhydride copolymer (dispersant) | 1 wt % |
| Microgel E-1002 (styrene-acrylic resin emulsion, resin component 19.9%, MFT about 80° C., manufactured by Nippon Paint Co., Ltd.) | 5 wt % |
| Glycerin | 5 wt % |
| Pure water | Balance |

Printing was continuously performed for 10 min at room temperature under atmospheric pressure to confirm that the ink composition was ejected through all nozzles without any trouble. Thereafter, the printer was stopped, and allowed to stand for one month with the printer head being capped under an environment of 40° C. and 25% RH. After the standing, printing was restarted to determine the number of cleaning operations necessary for the state of ejection equal to the initial state of ejection to be obtained. The results were as summarized in Table 2 below.

Evaluation

AAA: Recovered without any cleaning operation.

AA: Recovered by performing the cleaning operation once or twice.

A: Recovered by repeating the cleaning operation three to five times

B: Recovered by repeating the cleaning operation six to ten times

C: Not recovered even by repeating the cleaning operation ten times

TABLE 2

| Example. No. | Evaluation |
|---|---|
| Example. 1 | AAA |
| Example. 2 | AA |
| Example. 3 | A |
| Example. 4 | A |
| Example. 5 | A |
| Example. 6 | A |
| Comparative.Example.1 | C |

What is claimed is:

1. An ink composition comprising: a colorant; water; a watersoluble organic solvent; and a mixture of saccharides, wherein
said mixture of saccharides comprises (a) a monosaccharide and/or a derivative thereof, (b) a disaccharide and/or a derivative thereof, and (c) a tri or higher polysaccharide and/or a derivative thereof.

2. The ink composition according to claim 1, wherein the derivative is sugar alcohols, sugar acids, amino sugars, or thiosugars.

3. The ink composition according to claim 2, wherein the sugar alcohol is a monosaccharidesderived sugar alcohols or a disaccharidesderived sugar alcohols.

4. The ink composition according to claim 3, wherein the monosaccharidesderived sugar alcohol is selected from the group consisting of xylitol, sorbitol, and glycerin.

5. The ink composition according to claim 3, wherein the disaccharidesderived sugar alcohol is maltitol or isomaltiol.

6. The ink composition according to claim 2, wherein the disaccharide or tri or higher polysaccharide is a reducing branched oligosaccharide.

7. The ink composition according to claim 6, wherein the reducing branched oligosaccharide comprises at least two glucoses bonded to each other through an α-1, 6 glucoside linkage and has a branched structure.

8. The ink composition according to claim 6, wherein the reducing branched oligosaccharide has been prepared from one member or a mixture of two or more members selected from the group consisting of starch, amylopectin, and glycogen.

9. The ink composition according to claim 6, wherein the reducing branched oligosaccharide is isomaltose, panose, or isomaltotriose.

10. The ink composition according to any claim 1, wherein the total content of the monosaccharide and/or the derivative thereof and the tri or higher polysaccharide and/or the derivative thereof is 2% by weight to less than 30% by weight based on the total amount of the mixture of saccharides.

11. The ink composition according to claim 1, wherein the content of the disaccharide and/or the derivative thereof is more than 70% by weight to less than 98% by weight based on the total amount of the mixture of saccharides.

12. The ink composition according to claim 1, which further comprises a resin emulsion.

13. The ink composition according to claim 1, wherein the resin emulsion has a minimum film-forming temperature of 50° C. or above.

14. The ink composition according to claim 1, wherein the watersoluble organic solvent has a boiling point of 180° C. or above.

15. The ink, composition according to claim 1, which further comprises a glycol ether and/or an acetylene glycol surfactant.

16. The ink composition according to claim 15, wherein the acetylene glycol surfactant is a compound represented by formula (I):

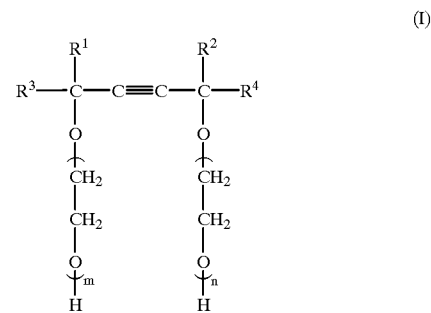

wherein m+n is 0 to 50; and $R^1$, $R^2$, $R^3$, and $R^4$ each independently represent an alkyl group.

17. The ink composition according to claim 1, which is used in an ink jet recording method.

18. The ink composition according to claim 17, wherein the ink jet recording method comprises the steps of ejecting droplets of the ink composition and depositing the droplets onto a recording medium to perform printing.

19. An ink jet recording muethod comprises the steps of ejecting droplets of an ink composition and depositing the droplets onto a recording medium to perform printing, said ink composition being one according to claim 1.

20. A print produced by the recording method according to claim 19.

21. The ink composition according to claim 1, wherein the colorant is a pigment that is present in the ink composition in an amount of about 0.5 to 25% by weight; wherein the water-soluble organic solvent is present in the ink composition in an amount of about 10 to 50% by weight and wherein the mixture of saccharides is present in the ink composition in an amount effective to improve the ejection stability of the ink composition in printing wherein the ink composition is ejected through a nozzle head of an ink jet printer.

* * * * *